(12) United States Patent
Wang et al.

(10) Patent No.: US 11,353,743 B2
(45) Date of Patent: Jun. 7, 2022

(54) BACKLIGHT MODULE, DISPLAY DEVICE AND METHOD FOR MANUFACTURING BACKLIGHT MODULE

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Yangbing Li, Beijing (CN); Ping Zhang, Beijing (CN); Likai Deng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/646,360

(22) PCT Filed: Mar. 1, 2019

(86) PCT No.: PCT/CN2019/076696
§ 371 (c)(1),
(2) Date: Mar. 11, 2020

(87) PCT Pub. No.: WO2020/177011
PCT Pub. Date: Sep. 10, 2020

(65) Prior Publication Data
US 2021/0215973 A1    Jul. 15, 2021

(51) Int. Cl.
*G02F 1/13357* (2006.01)
*G02F 1/1335* (2006.01)
*G02F 1/1333* (2006.01)

(52) U.S. Cl.
CPC .... *G02F 1/133605* (2013.01); *G02F 1/13338* (2013.01); *G02F 1/133607* (2021.01)

(58) Field of Classification Search
CPC .......... G02F 1/13336–133613; G02F 1/13338
See application file for complete search history.

(56) References Cited

U.S. PATENT DOCUMENTS

2016/0363272 A1* 12/2016 Chang ............... G02F 1/133609

FOREIGN PATENT DOCUMENTS

| CN | 104063704 | A |   | 9/2014 |
|----|-----------|---|---|--------|
| CN | 107168465 | A |   | 9/2017 |
| CN | 206490701 | U | * | 9/2017 |
| CN | 108983470 | A | * | 12/2018 |
| CN | 109061922 | A | * | 12/2018 |
| CN | 109061922 | A |   | 12/2018 |
| CN | 109061925 | A | * | 12/2018 |
| CN | 109271057 | A | * | 1/2019 |
| CN | 109271057 | A |   | 1/2019 |

(Continued)

*Primary Examiner* — Mariceli Santiago
(74) *Attorney, Agent, or Firm* — The Webb Law Firm (57) ABSTRACT

The present disclosure relates to a backlight module, a display device, and a method for manufacturing the backlight module. The backlight module includes: a substrate; an optical film layer disposed on one side of the substrate; and at least one photosensitive element disposed on the substrate and configured to sense light from one side of the optical film layer away from the substrate; wherein the optical film layer is provided with a micro-hole array, and an orthographic projection of the micro-hole array on the substrate at least partially overlaps with that of the at least one photosensitive element on the substrate.

14 Claims, 7 Drawing Sheets

(56) References Cited

FOREIGN PATENT DOCUMENTS

| | | | | |
|---|---|---|---|---|
| CN | 109375402 | A | * | 2/2019 |
| CN | 111095288 | A | * | 5/2020 |
| JP | 2012-18255 | A | | 1/2012 |

* cited by examiner

BACKLIGHT MODULE, DISPLAY DEVICE AND METHOD FOR MANUFACTURING BACKLIGHT MODULE

CROSS-REFERENCE TO RELATED APPLICATION

This application is the United States national phase of International Application No. PCT/CN2019/076696 filed Mar. 1, 2019, the disclosure of which is hereby incorporated by reference in its entirety.

BACKGROUND OF THE INVENTION

The present disclosure relates to the field of display, and in particular to a backlight module, a display device, and a method for manufacturing the backlight module.

FIELD OF THE INVENTION

With the development of 3D technology, there are more and more requirements for obtaining depth information of scenarios in technical applications such as stereoscopic display, machine vision, and satellite remote sensing. In the related art, a depth camera can be used to obtain depth information of a target within a field of view of a camera.

SUMMARY OF THE INVENTION

According to one aspect of the present disclosure, a backlight module is provided. The backlight module includes: a substrate; an optical film layer disposed on one side of the substrate; and at least one photosensitive element disposed on the substrate and configured to sense light from one side of the optical film layer away from the substrate; wherein the optical film layer is provided with a micro-hole array, and an orthographic projection of the micro-hole array on the substrate at least partially overlaps with that of the at least one photosensitive element on the substrate.

In some embodiments, the micro-hole array includes a plurality of micro-holes, and an inner wall of at least a part of the plurality of micro-holes is provided with a first reflective layer.

In some embodiments, the backlight module further includes a light absorbing layer provided between the inner wall and the first reflective layer.

In some embodiments, the backlight module further includes: a first light homogenizing layer including a first light homogenizing pattern and located on one side of the optical film layer away from the substrate, wherein an orthographic projection of the first light homogenizing pattern on the substrate at least partially overlaps with that of the micro-hole array on the substrate.

In some embodiments, the backlight module further includes: at least one light emitting element disposed on the substrate and configured to emit light for detection, wherein an orthographic projection of the at least one light emitting element on the substrate at least partially overlaps with that of the micro-hole array on the substrate.

In some embodiments, the at least one light emitting element includes an infrared light source, and the at least one photosensitive element includes an infrared light sensor.

In some embodiments, the backlight module further includes: a first backlight source disposed on the substrate and located between the at least one photosensitive element and the at least one light emitting element.

In some embodiments, the backlight module further includes: a second backlight source disposed on at least one side of the optical film layer along a direction parallel to the optical film layer.

In some embodiments, the at least one photosensitive element is located on one side of the substrate adjacent to the optical film layer.

In some embodiments, the substrate includes a transparent substrate and a second reflective layer having a light transmission area; wherein the second reflective layer is provided on a surface on one side of the transparent substrate adjacent to the optical film layer, the at least one photosensitive element is located on one side of the transparent substrate away from the optical film layer, and an orthographic projection of the light transmission area on the transparent substrate at least partially overlaps with that of the at least one photosensitive element on the transparent substrate.

In some embodiments, the at least one photosensitive element includes a photosensitive sensor, a filter disposed on one side of the photosensitive sensor adjacent to the optical film layer, and a lens disposed on one side of the filter adjacent to the optical film layer.

In some embodiments, the backlight module further includes: a light shielding structure surrounding the at least one photosensitive element, wherein a height of the light shielding structure in a direction perpendicular to the substrate is greater than that of the at least one photosensitive element in a direction perpendicular to the substrate.

In some embodiments, the optical film layer includes: a prism layer located on one side of the substrate; a diffusion layer located on one side of the prism layer adjacent to the substrate; and a quantum dot layer located between the diffusion layer and the prism layer.

According to one aspect of the present disclosure, a display device is provided. The display device includes: the backlight module as described above; and a display panel located on a light emitting side of the backlight module.

In some embodiments, the display panel further includes: a second light homogenizing layer including a second light homogenizing pattern and located on one side of the optical film layer away from the substrate, wherein an orthographic projection of the second light homogenizing pattern on the substrate at least partially overlaps with that of the micro-hole array on the substrate.

According to one aspect of the present disclosure, a method for manufacturing a backlight module is provided. The method includes: providing a substrate; providing at least one photosensitive element on the substrate; forming an optical film layer on one side of the substrate, and forming a micro-hole array on the optical film layer, wherein an orthographic projection of the micro-hole array on the substrate at least partially overlaps with that of the at least one photosensitive element on the substrate.

In some embodiments, when the at least one photosensitive element is provided, the method further include: providing a first backlight source and at least one light emitting element on the substrate; the step of providing the at least one photosensitive element, the first backlight source, and the at least one light emitting element includes: micro-transfer printing at least one of the at least one photosensitive element, the first backlight source, and the at least one light emitting element onto the substrate.

In some embodiments, the method for manufacturing a backlight module further includes: making an orthographic projection of the micro-hole array on the substrate at least partially overlap with that of the at least one light emitting element on the substrate when the micro-hole array is formed.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be more clearly understood from the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DESCRIPTION OF THE INVENTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure can be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word similar to "comprise/include" or "contain" means that the element before the word covers the element (s) listed after the word without excluding the possibility of also covering other elements. The terms "up", "down", "left", "right", or the like are used only to represent a relative positional relationship, and the relative positional relationship can be changed correspondingly if the absolute position of the described object changes.

In the present disclosure, when it is described that a particular device is located between the first device and the second device, there can be an intermediate device between the particular device and the first device or the second device, and alternatively, there can be no intermediate device. When it is described that a particular device is connected to other devices, the particular device can be directly connected to the other devices without an intermediate device, and alternatively, cannot be directly connected to the other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art cannot be discussed in detail, but where appropriate, these techniques, methods, and apparatuses should be considered as part of this specification.

In the related art, a detection solution implemented by a time-of-flight (TOF) depth camera module uses an independent TOF depth camera module based on a silicon-based image sensor. The module includes a plurality of members such as a light source, a receiving array, and a circuit. The light source emits a beam of modulated infrared light, which is reflected after irradiating to a target. The modulated square wave after reflection is received by the receiving array after passing through a lens. Then, the received information is demodulated by a demodulating unit, and a target distance is calculated. Such module that occupies more space is difficult to be miniaturized, and in addition, is also restricted by an internal structure of the display device, so that it is hard to be integrated.

In view of this, the present disclosure provides a backlight module, a display device, and a method for manufacturing the backlight module, which can implement integration of the photosensitive element in the backlight module.

Figure 1:
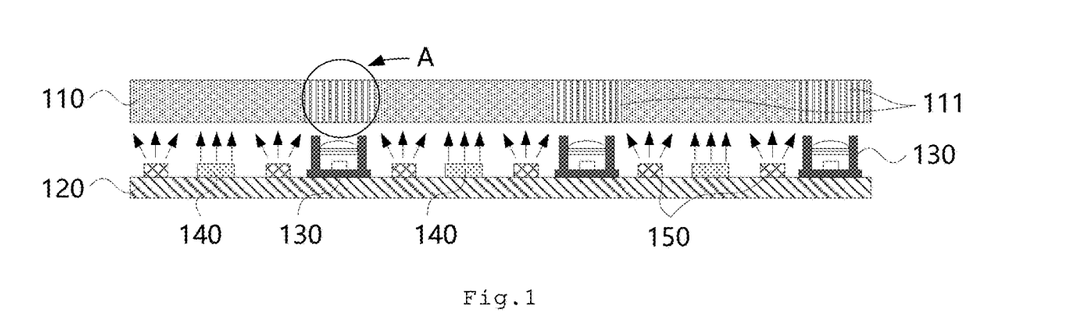
FIG. 1 is a schematic structural view of a backlight module according to an embodiment of the present disclosure.
Figure 2:
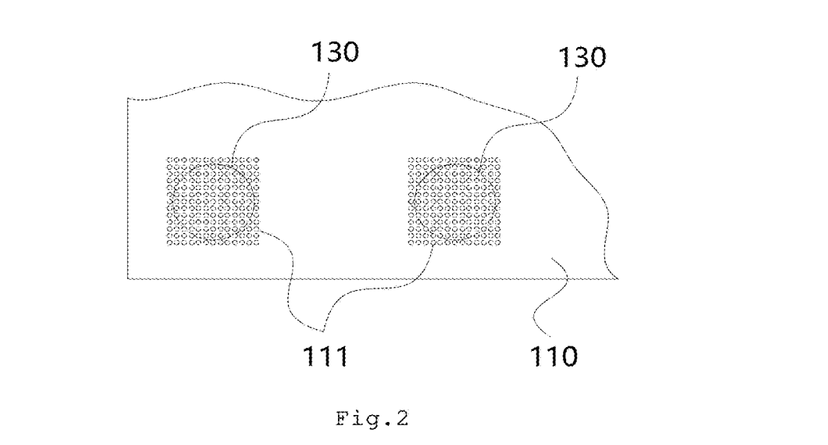
FIG. 2 is a partial top view of a backlight module according to an embodiment of the present disclosure.
Figure 3:
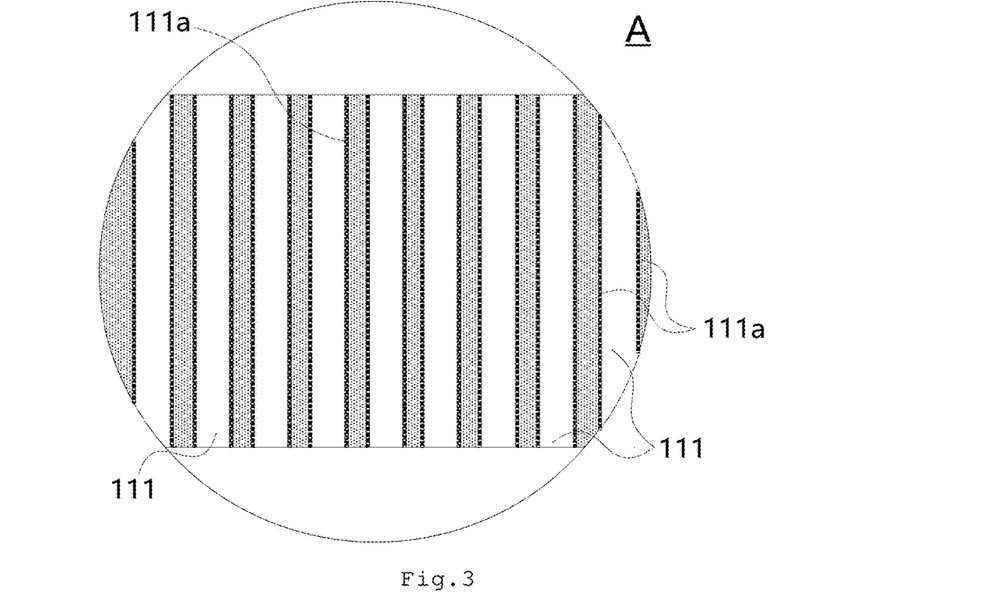
FIG. 3 is an enlarged schematic view of a position shown by a circle A in FIG. 1.

FIG. 1 is a schematic structural view of a backlight module according to an embodiment of the present disclosure. FIG. 2 is a partial top view of a backlight module according to an embodiment of the present disclosure. FIG. 3 is an enlarged schematic view of a position shown by a circle A in FIG. 1.

Referring to FIG. 1, in some embodiments, the backlight module includes: an optical film layer 110, a substrate 120, and at least one photosensitive element 130. The substrate 120 can be disposed on one side of the optical film layer 110. At least one photosensitive element 130 can be disposed on the substrate 120 and configured to sense light from one side of the optical film layer 110 away from the substrate 120, so that the backlight module integrates the photosensitive element 130.

Considering the influence of the optical film layer 110 on the light received by the photosensitive element 130, such as blurring and distortion of the optical signal received by the photosensitive element 130, referring to FIGS. 1 and 2, in some embodiments, the optical film layer 110 is provided with a micro-hole array 111, wherein an orthographic projection of the micro-hole array 111 on the substrate 120 at least partially overlaps with that of the at least one photosensitive element 130 on the substrate 120. The orthographic projection of the micro-hole array 111 on the substrate 120 can completely overlap with that of the at least one photosensitive element 130 on the substrate 120 so as to obtain a favorable optical signal receiving effect. In another embodiment, the orthographic projection of the micro-hole array 111 on the substrate 120 can also partially overlap with that of at least one photosensitive element 130 on the substrate 120.

The light from one side of the optical film layer 110 away from the substrate 120 can be directly projected onto the photosensitive element 130 through the micro-hole array 111 and an image is formed on the photosensitive element 130. Since the light entering the photosensitive element 130 is not refracted by the optical film layer 110, on one hand, the light intensity loss of the light received by the photosensitive element is reduced, thereby facilitating reducing the power consumption of the photosensitive element; on the other hand, it is also possible to eliminate the adverse effects brought by the optical film layer, such as blurring and distortion of the optical signal, thereby improving the image forming quality of the photosensitive element.

The micro-hole array 111 includes a plurality of micro-holes. The plurality of micro-holes can be arranged in an array and penetrate the entire optical film layer 110 along a thickness direction of the optical film layer 110. The micro-hole diameter in the micro-hole array 111 can be 3 μm to 5 mm. The pitch of adjacent micro-holes can be determined according to an allowable accuracy of a machining process, for example, greater than 1 μm. According to the number of the photosensitive elements 130, a plurality of groups of micro-hole arrays 111 can be provided in the optical film layer 110. In some embodiments, each photosensitive element 130 can correspond to one micro-hole array 111. In other embodiments, two or more photosensitive elements 130 can correspond to one micro-hole array 111, or one photosensitive element 130 corresponds to two or more micro-hole arrays 111.

Referring to FIG. 3, in some embodiments, a first reflective layer 111a can be provided on an inner wall of at least a part of the micro holes of the micro hole array 111. The first reflective layer 111a can prevent light entering the micro-holes from being refracted by the inner wall of the micro-holes into the optical film layer 110, and reduce the light intensity loss of the light received by the photosensitive element, and can also shield light emitted from an interior of the optical film layer 110 to an outer side of the micro-hole wall by reflection, thereby improving the signal-to-noise ratio of the photosensitive element 130. The first reflective layer 111a can include a metal plating layer, for example, a metal plating layer such as a copper plating layer is formed on the inner wall of the micro-hole using an electroplating process. It is also possible to use other processes (such as spray coating or vapor deposition) and other reflective layer materials (such as alloy or non-metal material). In other embodiments, a light absorbing layer can also be provided between the inner wall of the micro-hole provided with the reflective layer and the first reflective layer, such that the light emitted from an interior of the optical film layer 110 to an outer side of the micro-hole wall is absorbed by the light absorbing layer.

In FIG. 1, the substrate 120 can be a printed circuit board (PCB). The photosensitive element 130 can be located on one side of the substrate 120 adjacent to the optical film layer 110. Other elements can be also provided on the substrate 120 to implement integration of more functions in the backlight module. The photosensitive element 130 and other elements can be provided on the substrate 120 together by a micro-transfer printing manner.

Referring to FIG. 1, in some embodiments, the backlight module can be a direct-type backlight module. Correspondingly, a first backlight 150 can be provided on one side of the substrate 120 adjacent to the optical film layer 110 (the light emitted by the backlight source is displayed by an arrow in FIG. 1). The first backlight source 150 can use conventional or mini LEDs, which can be arranged in an array on the substrate 120. A plurality of photosensitive elements 130 can be arranged between the respective Mini Leds. By providing the micro-hole array 111 on the optical film layer 110 and the photosensitive element 130 on the substrate 120, it is possible to implement integration of the photosensitive element 130 by the direct backlight module.

In FIG. 1, the backlight module can further include at least one detection light emitting element 140 as needed. The at least one detection light emitting element 140 is disposed on the substrate 120. The detection light emitting element 140 can be configured to emit detection light toward one side of the optical film layer 110 away from the substrate 120 (the detection light emitted by the detection light emitting element is displayed by an arrow in FIG. 1), so that the direct-type backlight module implements integration of the detection light emitting element 140.

The detection light emitting element 140 can be an optical element capable of emitting visible light or non-visible light, such as an infrared light source. The photosensitive element 130 can receive reflected light on an object from the light emitted by the detection light emitting element 140 or other light emitting elements. For example, the photosensitive element 130 can include an infrared light sensor, such as a 3D TOF sensor, which can sense reflected light from the infrared light source on one side of the optical film layer 110 away from the substrate 120. The 3D TOF sensor can obtain a 3D depth image of an object to be detected by detecting the reflected light of the infrared light source, thereby improving the spatial positioning capability, and enabling to implement various applications as needed, such as gesture recognition.

In the embodiments of the direct-type backlight module, the first backlight source 150 can use Mini Leds arranged in an array on the substrate 120, and a plurality of detection light emitting elements 140 can be arranged among respective Mini Led.

Figure 4:
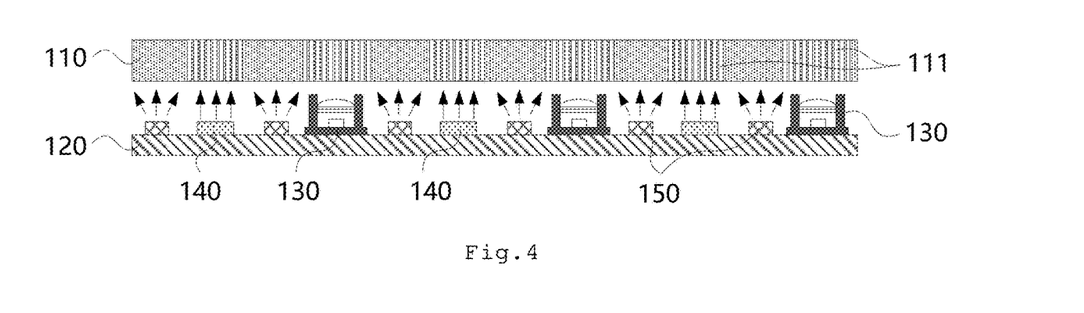
FIGS. 4-6 are respectively schematic structural views of a backlight module according to some embodiments of the present disclosure.
Figure 5:
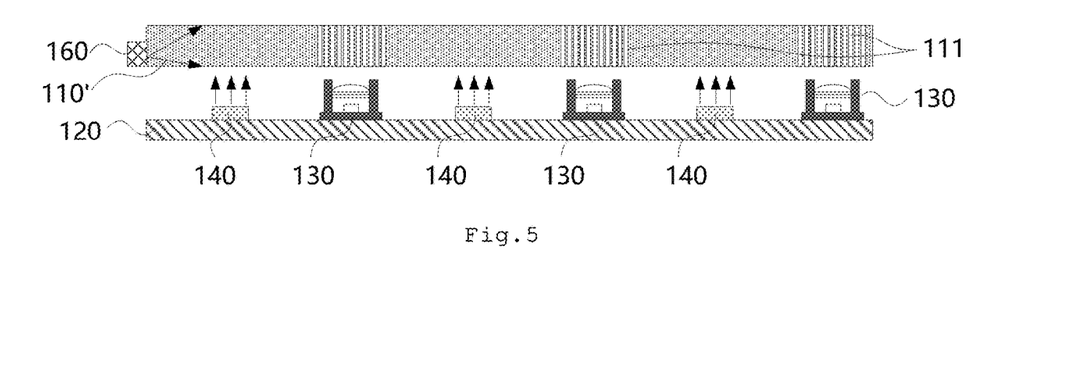
Figure 6:
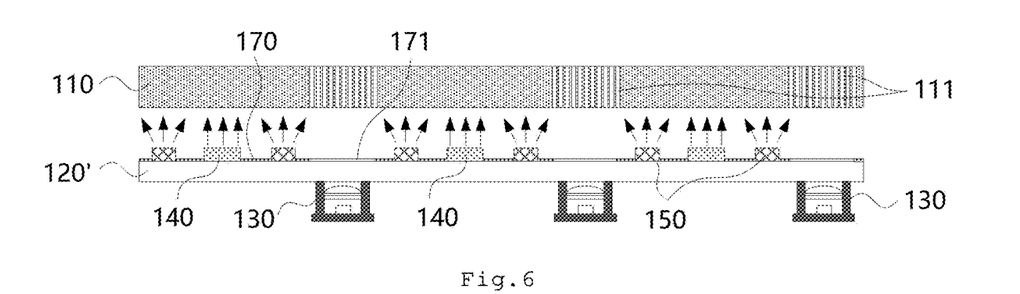

FIGS. 4-6 are respectively schematic structural views of a backlight module according to some embodiments of the present disclosure.

Referring to FIG. 4, in some embodiments, the substrate 120 is provided with at least one detection light emitting element 140. The orthographic projection of the micro-hole array 111 on the substrate 120 can at least partially overlap with that of the at least one detection light emitting element 140 on the substrate 120. Since the light emitted by the detection light emitting element 140 is directly emitted to one side of the optical film layer 110 away from the substrate 120 through the micro-hole array 111, the light emission loss of the detection light emitting element 140 can be reduced, thereby facilitating reducing the power consumption of the detection light emitting element 140.

In some embodiments, each detection light emitting element 140 can correspond to one micro-hole array 111. In other embodiments, two or more detection light emitting elements 140 can correspond to one micro-hole array 111, or one detection light emitting element 140 corresponds to two or more micro-hole arrays 111.

If a wide light transmission hole is provided in the optical film layer to directly transmit light through the optical film layer, in order to allow the light transmission hole to directly face the photosensitive element or the detection light emitting element, it is generally necessary to perform accurate alignment as much as possible during the manufacture. In addition, it is often necessary to provide a light transmission hole having a size larger than a light receiving area of the photosensitive element or a light emitting area of the detection light emitting element. Such wide light transmission hole can allow that the display of the display device using such backlight module is more prominently affected. However, in the embodiments of the present disclosure, the area of each micro-hole array in the optical film layer can be determined according to a light receiving area of the photosensitive element or a light emitting area of the detection light emitting element, there is no need to perform very accurate alignment, and the display of the display device will not be prominently affected even when the area is wide.

Referring to FIG. 5, in some embodiments, the backlight module can be an edge-type backlight module. The second backlight source 160 can be disposed on at least one side of the optical film layer 110' along a direction parallel to the optical film layer 110' (the light emitted by the backlight source is displayed by an arrow in FIG. 5). For example, the optical film layer 110' includes a light guide plate or a light guide film. The second backlight source 160 is located on at least one side of the light guide plate or the light guide film along a direction parallel to the light guide plate or the light guide film. After the light emitted by the second backlight source 160 is refracted and reflected within the optical film layer 110', a light homogenizing emitting effect is formed on one side of the optical film layer 110' away from the substrate 120. By providing the micro-hole array 111 in the optical film layer 110' and the photosensitive element 130 on the substrate 120, it is possible to implement integration of the photosensitive element 130 by the edge-type backlight module.

In other embodiments, the substrate 120 is further provided with a detection light emitting element 140. By providing the photosensitive element 130 on the substrate 120, it is possible to implement integration of the detection light emitting element 140 by the edge-type backlight module.

Referring to FIG. 6, in some embodiments, the substrate includes a transparent substrate 120'. The transparent substrate 120' can be a glass sheet or the like. A second reflective layer 170 is provided on a surface on one side of the transparent substrate 120' adjacent to the optical film layer 110, and the photosensitive element 130 is located on one side of the transparent substrate 120' away from the optical film layer 110. The second reflective layer 170 can reflect the light incident on the transparent substrate 120' to a light emitting side of the backlight module, thereby improving the light utilization rate. The second reflective layer 170 can be a metal layer or other film layer capable of reflecting light.

A light transmission area 171 can further be included within the second reflective layer 170. The orthographic projection of the light transmission area 171 on the transparent substrate 120' at least partially overlaps with that of the at least one photosensitive element 130 on the transparent substrate 120'. In this way, the light entering from the micro-hole array 111 can enter the photosensitive element 130 after passing through the light transmission area 171 and the transparent substrate. Thus, the photosensitive element 130 can be located on both sides of the transparent substrate 120' with the detection light emitting element 140 and the first backlight 150, respectively. Accordingly, during the manufacture of the backlight module, the photosensitive element can be manufactured separately from the detection light emitting element 140 and the first backlight source 150 so that the manufacturing processes do not affect each other, thereby facilitating improving the yield of the product and enhancing the independence of the elements. In other embodiments, the substrate can also be a non-transparent plate. Correspondingly, a light transmission hole can be provided at a position of the substrate corresponding to the photosensitive element 130.

Figure 7:
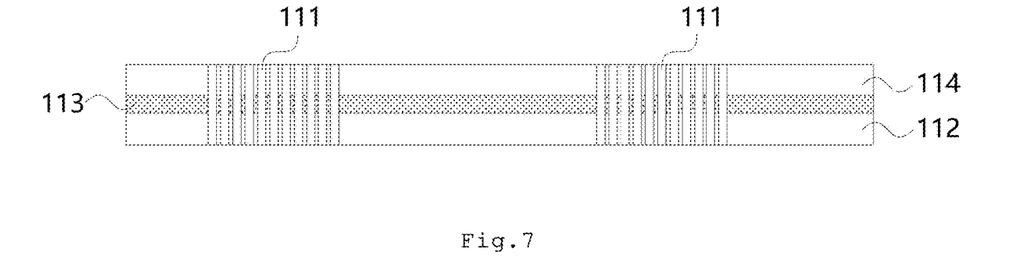
FIG. 7 is a schematic structural view of an optical film layer of a backlight module according to an embodiment of the present disclosure.

FIG. 7 is a schematic structural view of an optical film layer of a backlight module according to an embodiment of the present disclosure.

Referring to FIG. 7, in some embodiments, the optical film layer can include a diffusion layer 112 and a prism layer 114. The prism layer 114 is located on one side of the substrate 120, and the diffusion layer 112 is located on one side of the prism layer 114 adjacent to the substrate 120. The prism layer 114 can achieving the effect of converging the light and improving forward light emission with an enhanced brightness by refraction and reflection of the light. The diffusion layer 112 can be configured to improve the distribution of the backlight, so that the backlight module can generate a blurred and uniform surface light source.

In FIG. 7, the optical film layer can further include a quantum dot (QD) layer 113 located between the diffusion layer 112 and the prism layer 114. The QD layer 113 can realize scattering light emission to allow a more light homogenizing emission of the backlight module under the excitation of the light emitted from the first backlight source 150.

The micro-hole array 111 can be distributed at positions of the optical film layer 110 corresponding to the photosensitive element 130 and the detection light emitting element 140 respectively, and the micro-holes sequentially penetrate the diffusion layer 112, the QD layer 113, and the prism layer 114 along a thickness direction of the optical film layer 110.

Figure 8:
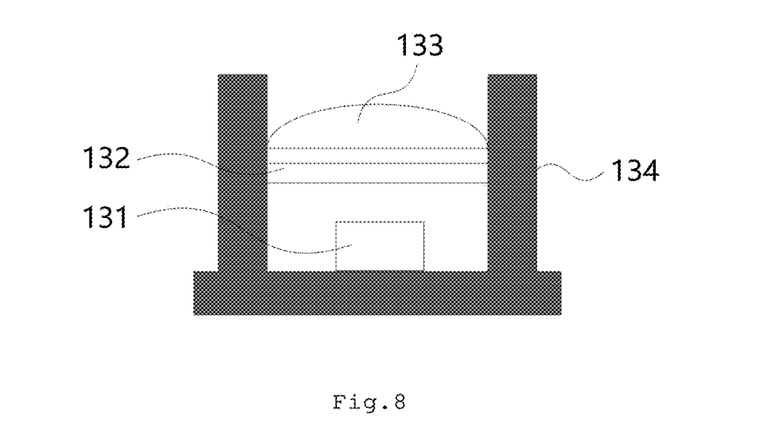
FIG. 8 is a schematic structural view of a photosensitive element of a backlight module according to an embodiment of the present disclosure.
Figure 9:
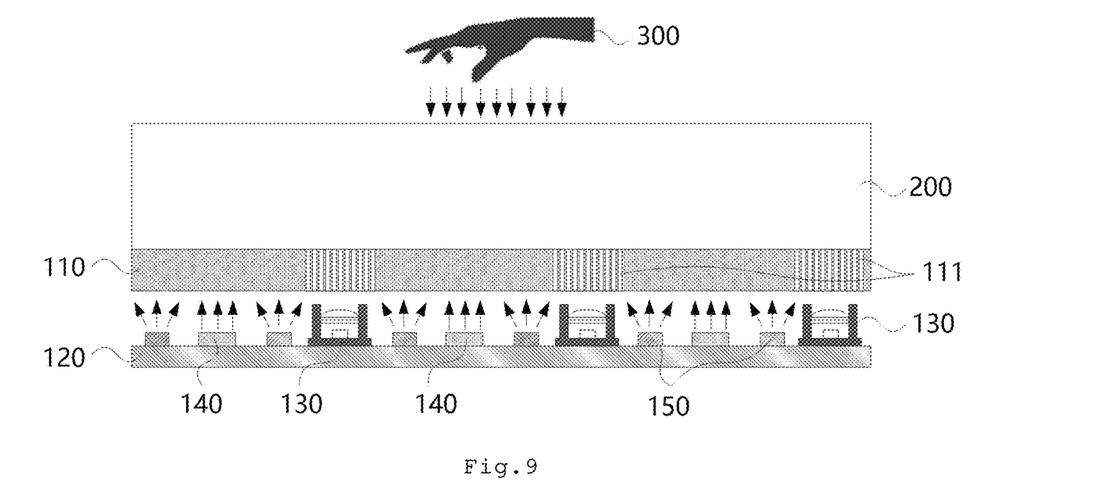
FIGS. 9 to 14 are respectively schematic structural views of a display device according to some embodiments of the present disclosure.

FIG. 8 is a schematic structural view of a photosensitive element of a backlight module according to an embodiment of the present disclosure.

Referring to FIG. 8, in some embodiments, the photosensitive element 130 includes a photosensitive sensor 131, a filter 132, and a lens 133. The photosensitive sensor 131 can be an infrared light sensor. The filter 132 which is disposed on one side of the photosensitive sensor 131 adjacent to the optical film layer 110, can be configured to filter out other light that does not include light of a specific wavelength required to be received by the photosensitive sensor 131. For example, for the photosensitive sensor 131 sensing infrared light, the filter 132 can filter out stray light other than infrared light. The lens 133 is disposed on one side of the filter 132 adjacent to the optical film layer 110. The light located on an incoming light side of the photosensitive element 130 can be converged by the lens 133 and form an image on the photosensitive sensor 131.

In order to eliminate the interference of other light outside the photosensitive element 130 with the photosensitive element 130, in some embodiments, a light shielding structure 134 is provided around the photosensitive element 130. In FIG. 8, the height of the light shielding structure 134 in a direction perpendicular to the substrate 120 is greater than that of the photosensitive element 130 in a direction perpendicular to the substrate 120, so as to prevent the light outside the light shielding structure 134 from entering the photosensitive sensor from a light receiving side of the photosensitive element 130. The light shielding structure 134 can be disposed on the substrate 120 or on the photosensitive element 130 as long as it can implement shielding the light other than the light receiving side.

In FIG. 6, the light shielding structure 134 can also be encapsulated in the photosensitive element 130 as a part of the photosensitive element 130. The light shielding structure 134 includes a bottom plate and a lateral plate. The bottom plate is located on one side of the photosensitive sensor 131 away from the incoming light side. The lateral plate is located outside the photosensitive sensor 131, the filter 132, and the lens 133 along an extending direction of the bottom plate. The upper edge of the lateral plate can be higher than the lens 133. In FIGS. 1, 4 to 5, the bottom plate of the shielding structure 134 is disposed on one side of the substrate 120 adjacent to the optical film layer 110. In FIG. 6, the upper edge of the lateral plate of the shielding structure 134 is disposed on one side of the substrate 120' away from the optical film layer 110.

FIGS. 9 to 14 are respectively schematic structural views of a display device according to some embodiments of the present disclosure.

Based on the aforementioned embodiments of the backlight module, referring to FIGS. 9 to 14, in some embodiments, the display device includes the aforementioned backlight module and a display panel 200. The display panel 200 is located on a light emitting side of the backlight module (i.e., an upper side in FIGS. 9 to 14). The photosensitive element 130 integrated in the backlight module can receive the reflected light from the object 300 (shown by an arrow in FIGS. 9 to 14). For example, when the photosensitive element 130 is configured for gesture recognition, the light emitted from the detection light emitting element 140 is irradiated to a hand of a person after passing through the optical film layer 110 and the display panel 200. The reflected light from a hand of a person enters the photosensitive element 130 through the display panel 200 and the micro-hole array 111 in the optical film layer 110 so as to form an image.

Figure 10:
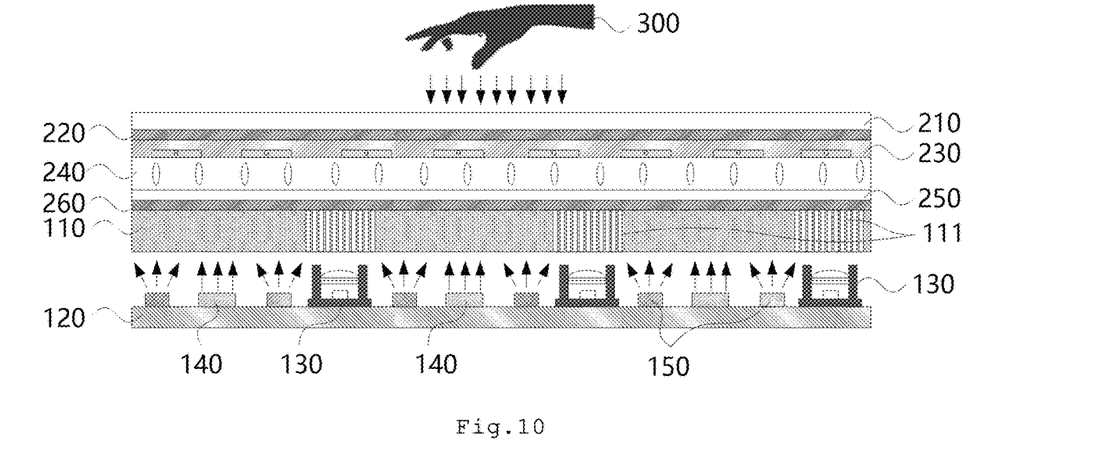

Referring to FIG. 10, in some embodiments, the display panel 200 can be a liquid crystal display panel. For example, the display panel 200 in FIG. 10 includes: a cover plate 210, a first polarizing layer 220, a color filter layer 230, a liquid crystal layer 240, an electrode layer 250, and a second polarizing layer 260. The second polarizing layer 260 is located on one side of the optical film layer 110 away from the substrate 120, that is, a light emitting side of the backlight module. Along a direction away from the substrate 120, there are sequentially the second polarizing layer 260, the electrode layer 250, the liquid crystal layer 240, the color filter layer 230, the first polarizing layer 220, and the cover plate 210. The first polarizing layer 220 and the second polarizing layer 260 are configured to control a polarizing direction of light. The color filter layer 230 is configured to allow light selected of a specific wavelength band to pass therethrough, so as to implement display of various colors. The liquid crystal molecules contained in the liquid crystal layer 240 can be deflected under the action of an electric field formed by the electrode layer 250, thereby implementing light emitting control.

Figure 11:
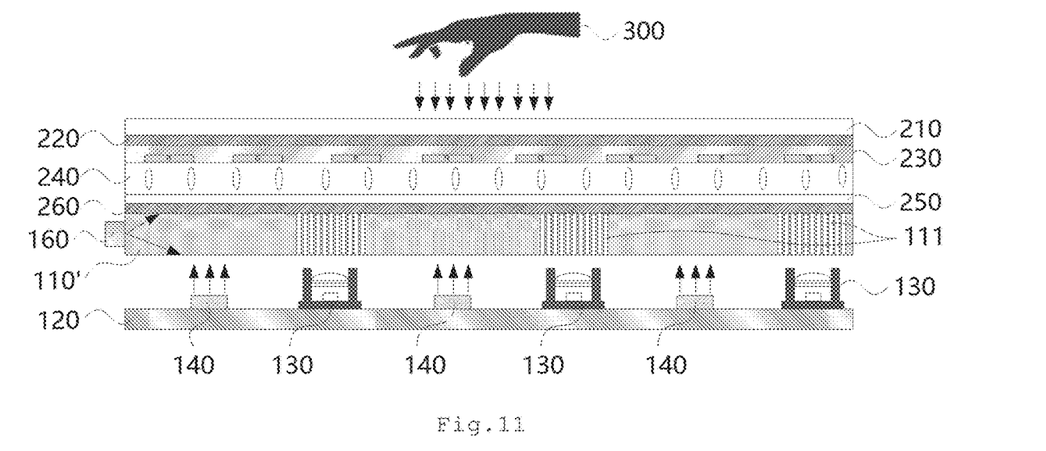

In FIG. 10, the backlight module is a direct-type backlight module that integrates the photosensitive element 130 and the detection light emitting element 140. In contrast, the backlight module in the embodiment of the display device shown in FIG. 11 is an edge-type backlight module that integrates the light receiving element 130 and the detection light emitting element 140.

Figure 12:
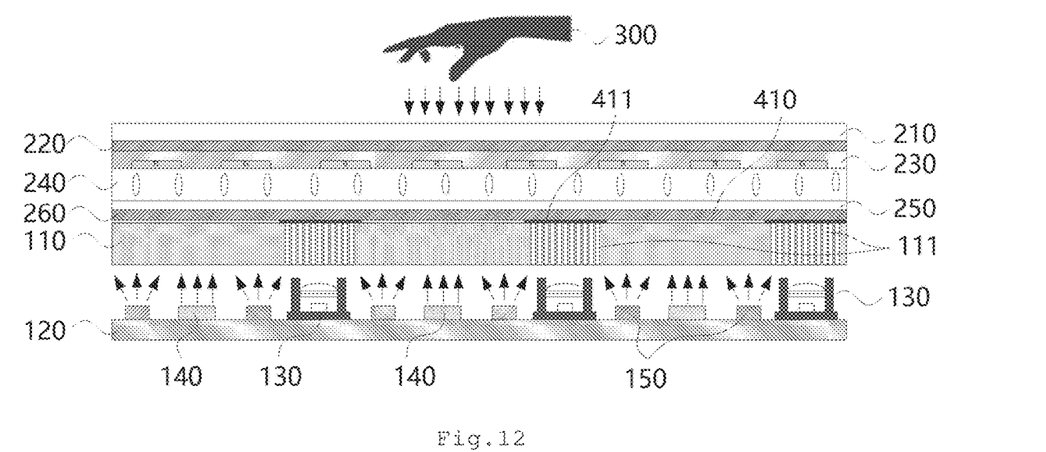

Referring to FIG. 12, in some embodiments, the backlight module further includes a first light homogenizing layer 410, which is located on one side of the optical film layer 110 away from the substrate 120. The first light homogenizing layer 410 can be located between the optical film layer 110 and the display panel 200, for example, between the optical film layer 110 and the second polarizing layer 260 of the display panel 200. The first light homogenizing layer 410 includes a first light homogenizing pattern 411, and the orthographic projection of the first light homogenizing pattern 411 on the substrate 120 at least partially overlaps with that of the micro-hole array 111 on the substrate 120. The first light homogenizing pattern 411 can weaken a brighter visible light of the display panel 200 in an area corresponding to the micro-hole array 111, thereby allowing a more uniform forward light intensity of the display panel 200 and an easier optical correction, and further improving the display quality of the display device. In addition, the first light homogenizing pattern 411 can also shield the visible stray light on a light receiving side of the photosensitive element 130, and reduce the interference of the visible stray light on the photosensitive element 130.

Figure 13:
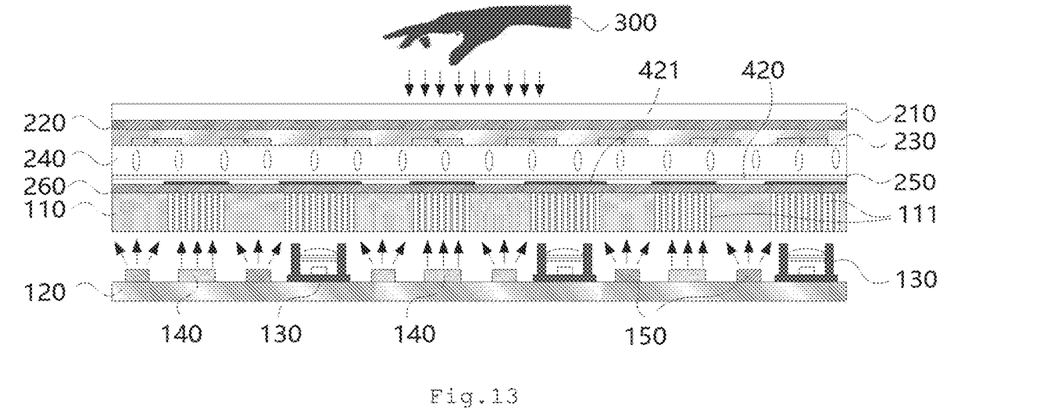

Referring to FIG. 13, in some embodiments, the display panel in the display device can include a second light homogenizing layer 420. The second light homogenizing layer 420 is located on one side of the optical film layer 110 away from the substrate 120. For example, the second light homogenizing layer 420 can be located between the second polarizing layer 260 and the electrode layer 250 of the display panel. In other embodiments, the second light homogenizing layer 420 can also be formed together with the electrode layer 250. The second light homogenizing layer 420 includes a second light homogenizing pattern 421, and the orthographic projection of the second light homogenizing pattern 421 on the substrate 120 at least partially overlaps with that of the micro-hole array 111 on the substrate 120.

The first light homogenizing pattern 411 and the second light homogenizing pattern 421 can be made from silver, indium tin oxide (ITO), indium tin oxide-silver (ITO-Ag), or indium tin oxide-silver-indium tin oxide (ITO-Ag-ITO) and the like, which can be formed by a process such as etching on a transparent substrate. For ITO-Ag or ITO-Ag-ITO, the designer can adjust a thickness of the ITO layer and the Ag layer to meet the needs of a light homogenizing intensity.

Figure 14:
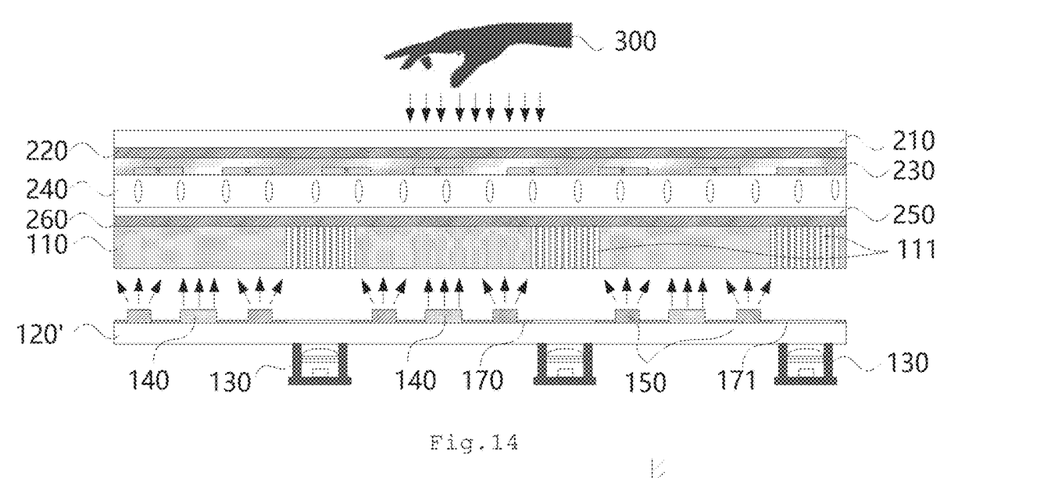

Referring to FIG. 14, in some embodiments, the photosensitive element 130 can be located on one side of the transparent substrate 120' away from the optical film layer 110. For the backlight module integrated with the detection light emitting element 140 in the embodiments shown in FIGS. 9 to 14, the orthographic projection of the micro-hole array 111 on the substrate 120 can at least partially overlap with that of the at least one detection light emitting element 140 on the substrate 120.

Figure 15:
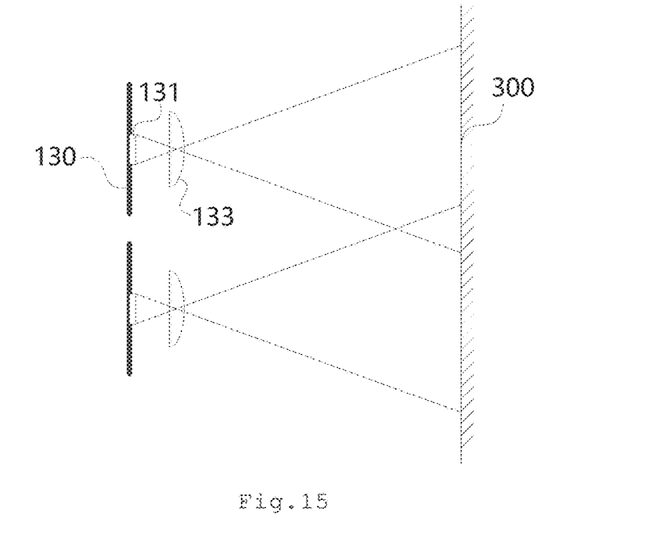
FIG. 15 is a schematic view of an equivalent optical path during implementation of depth recognition of a display device according to an embodiment of the present disclosure.

FIG. 15 is a schematic view of an equivalent optical path during implementation of depth recognition of a display device according to an embodiment of the present disclosure.

Referring to FIG. 15, in some embodiments, the photosensitive element and the detection light emitting element in the backlight module can be configured to detect depth information of an object, so as to implement specific applications such as gesture recognition. In FIG. 13, a plurality of photosensitive elements 130 can be arranged on the substrate of the backlight module. When the detection light emitting element emits light onto the object 300 located on a light emitting side of the display panel, the light reflected by the object 300 passes through the lens 133 of the photosensitive element 130, and an image is formed on the photosensitive sensor 131 of the photosensitive element 130.

The number and arrangement interval of the photosensitive elements 130 can be provided according to the image forming overlap condition of the object 300. In FIG. 15, the images of the object 300 have partially overlapped each other, so that the images formed by a plurality of photosensitive elements 130 can form a complete depth view of the object 300 by mosaic, thereby helping to implement gesture recognition or spatial interaction.

Figure 16:
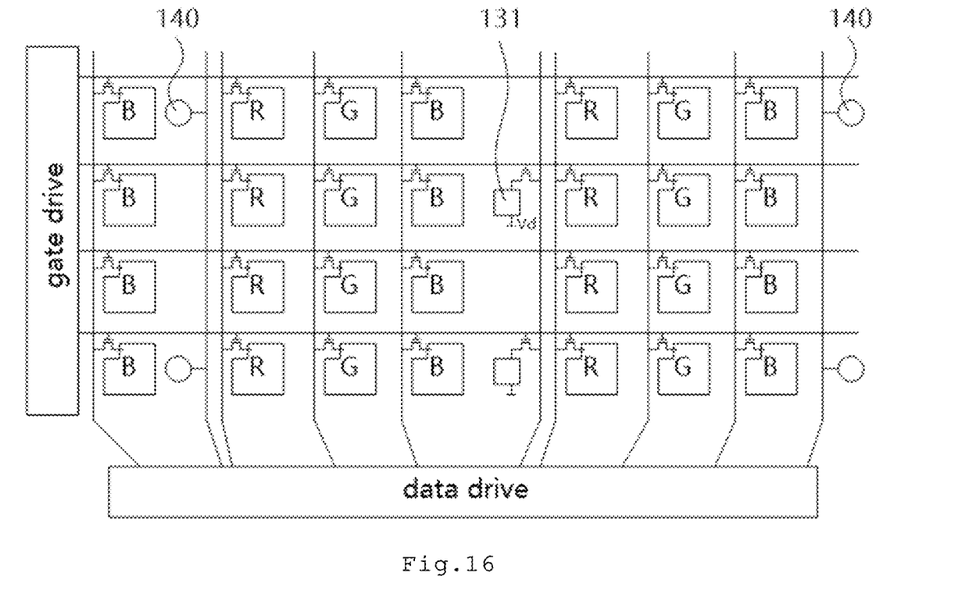
FIG. 16 is a schematic arrangement view of a photosensitive element, a light emitting element, and sub-pixel units in a display panel of a display device according to an embodiment of the present disclosure.

FIG. 16 is a schematic arrangement view of a photosensitive element, a detection light emitting element, and sub-pixel units in a display panel of a display device according to an embodiment of the present disclosure;

Referring to FIG. 16, in some embodiments, the display panel includes a plurality of pixels, each of which includes sub-pixel units R, G, and B. The sub-pixel units R, G, and B are driven by a gate driving circuit and a data driving circuit. The photosensitive sensor 131 and the detection light emitting element 140 are also electrically connected to the gate driving circuit and the data driving circuit, and driven by the gate driving circuit and the data driving circuit. The projections of the photosensitive sensor 131 in the photosensitive element 130 integrated in the backlight module and the detection light emitting element 140 on the display panel are located among the respective sub-pixel units. The photosensitive sensor 131 and the detection light emitting element 140 can be located in the same sub-pixel row or the same sub-pixel column, or can also be respectively located in different sub-pixel rows or sub-pixel columns as needed in design.

In the above-mentioned respective embodiments of the backlight module and the display device, FIGS. 7, 8 and 10 which respectively provide structural examples of the optical film layer, the photosensitive element, and the display panel to assist in the description, should not be understood as limiting the structures of the film layer, the photosensitive element, and the display panel. In different embodiments, the structures of the optical film layer, the photosensitive element and the display panel can be provided according to actual needs.

Figure 17:
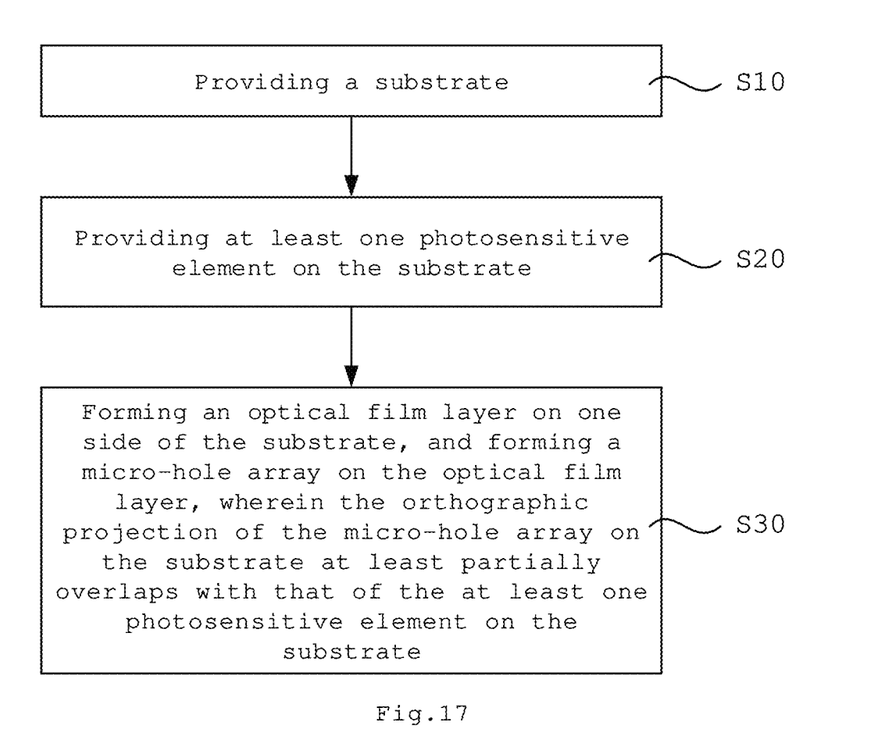
FIG. 17 is a schematic flowchart of a method for manufacturing a backlight module according to an embodiment of the present disclosure.

FIG. 17 is a schematic flowchart of a method for manufacturing a backlight module according to an embodiment of the present disclosure.

Referring to FIG. 17 and the respective embodiments of the backlight module and the display device described above, in some embodiments, a method for manufacturing a backlight module includes steps S10-S30. In step S10, a substrate is provided. The substrate can be a PCB or a transparent plate. In step S20, at least one photosensitive element is provided on the substrate. If the substrate is a PCB, a photosensitive element can be provided above the substrate, and a light receiving side of the photosensitive element can be provided to be a direction away from the substrate. If the substrate is a transparent plate, a photosensitive element is provided below the substrate, and a second reflective layer including a light transmission area is formed above the substrate. The orthographic projection of the light transmission area on the transparent substrate at least partially overlaps with that of the at least one photosensitive element on the transparent substrate.

In step S30, an optical film layer is formed on one side of the substrate, and a micro-hole array is formed on the optical film layer. The orthographic projection of the micro-hole array on the substrate at least partially overlaps with that of the at least one photosensitive element on the substrate. When the optical film layer is formed, the optical film layer can be located on a light receiving side of the photosensitive element. When the micro-hole array is formed or after the micro-hole array is formed, a first reflective layer can be formed on an inner wall of at least a part of the plurality of micro-holes included in the micro-hole array. For example, a copper plating layer capable of shielding the light can be formed in a copper electroplating manner.

When a photosensitive element is provided, a detection light emitting element, such as an infrared light source, can also be provided on the substrate as needed. If a detection light emitting element is provided on the substrate, when the micro-hole array is formed, it is possible to allow that the orthographic projection of the micro-hole array on the substrate partially overlaps with that of the at least one detection light emitting element on the substrate. In addition, a first backlight source, such as a conventional or mini LED array, can also be provided on the substrate.

When at least one of the photosensitive element, the first backlight source, and the detection light emitting element is provided, a micro-transfer printing (μTP) technology can be used. The micro-transfer printing technology is a micro assembly technology that enables a plurality of small devices to move accurately at the same time, for example, to implement an accurate movement of hundreds of devices in sub-millimeter-level. In some embodiments, at least one of the at least one photosensitive element, the first backlight source, and the at least one detection light emitting element can be micro-transfer printed onto the substrate. By applying such micro-transfer printing technology, the backlight module can conveniently and quickly integrate a large number of functional elements, thereby further improving the process accuracy and efficiency.

Multiple embodiments in the present description are described in a progressive manner, with different focuses for the respective embodiments which can be subjected to cross-reference for the same or similar portions. For the embodiments of the method, since the method as a whole and the steps involved are in a certain relationship corresponding to the content in the embodiments of the backlight module and the display device, such embodiments are described in a relatively simple manner. The partial descriptions of the embodiments of the backlight module and the display device can be referred thereto for the relevant aspects.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the present disclosure is defined by the appended claims.

What is claimed is:

1. A backlight module comprising:
a substrate;
an optical film layer disposed on one side of the substrate; and
at least one photosensitive element disposed on the substrate and configured to sense light from one side of the optical film layer away from the substrate;
wherein the optical film layer is provided with a micro-hole array, an orthographic projection of the micro-hole array on the substrate at least partially overlaps with that of the at least one photosensitive element on the substrate, and the at least one photosensitive element comprises a photosensitive sensor, a filter disposed on one side of the photosensitive sensor adjacent to the optical film layer, and a lens disposed on one side of the filter adjacent to the optical film layer,
wherein the micro-hole array comprises a plurality of micro-holes, and an inner wall of at least a part of the plurality of micro-holes comprising a first reflective layer,
wherein the backlight module further comprises a light absorbing layer provided between the inner wall and the first reflective layer.

2. The backlight module according to claim 1, further comprising:
a first light homogenizing layer comprising a first light homogenizing pattern and located on one side of the optical film layer away from the substrate,
wherein an orthographic projection of the first light homogenizing pattern on the substrate at least partially overlaps with that of the micro-hole array on the substrate.

3. The backlight module according to claim 1, further comprising:
at least one light emitting element disposed on the substrate and configured to emit light for detection,
wherein an orthographic projection of the at least one light emitting element on the substrate at least partially overlaps with that of the micro-hole array on the substrate.

4. The backlight module according to claim 3, wherein the at least one light emitting element comprises an infrared light source, and the at least one photosensitive element comprises an infrared light sensor.

5. The backlight module according to claim 3, further comprising:
a first backlight source disposed on the substrate and located between the at least one photosensitive element and the at least one light emitting element.

6. The backlight module according to claim 1, further comprising:
a backlight source disposed on at least one side of the optical film layer along a direction parallel to the optical film layer.

7. The backlight module according to claim 1, wherein the at least one photosensitive element is located on one side of the substrate adjacent to the optical film layer.

8. The backlight module according to claim 1, further comprising:
a light shielding structure surrounding the at least one photosensitive element,
wherein a height of the light shielding structure in a direction perpendicular to the substrate is greater than that of the at least one photosensitive element in a direction perpendicular to the substrate.

9. The backlight module according to claim 1, wherein the optical film layer comprises:
a prism layer located on one side of the substrate;
a diffusion layer located on one side of the prism layer adjacent to the substrate; and
a quantum dot layer located between the diffusion layer and the prism layer.

10. A display device comprising:
the backlight module according to claim 1; and
a display panel located on a light emitting side of the backlight module.

11. The display device according to claim 10, wherein the display panel further comprises:
a light homogenizing layer comprising a light homogenizing pattern and located on one side of the optical film layer away from the substrate,
wherein an orthographic projection of the light homogenizing pattern on the substrate at least partially overlaps with that of the micro-hole array on the substrate.

12. A backlight module comprising:
a substrate;
an optical film layer disposed on one side of the substrate; and
at least one photosensitive element disposed on the substrate and configured to sense light from one side of the optical film layer away from the substrate;
wherein the optical film layer is provided with a micro-hole array, an orthographic projection of the micro-hole array on the substrate at least partially overlaps with that of the at least one photosensitive element on the substrate, and the at least one photosensitive element comprises a photosensitive sensor, a filter disposed on one side of the photosensitive sensor adjacent to the optical film layer, and a lens disposed on one side of the filter adjacent to the optical film layer,
wherein the substrate comprises a transparent substrate and a reflective layer having a light transmission area; and wherein the reflective layer is provided on a surface on one side of the transparent substrate adjacent to the optical film layer, the at least one photosensitive element is located on one side of the transparent substrate away from the optical film layer, and an orthographic projection of the light transmission area on the transparent substrate at least partially overlaps with that of the at least one photosensitive element on the transparent substrate.

13. A method for manufacturing a backlight module comprising:
providing a substrate;
providing at least one photosensitive element on the substrate;
forming an optical film layer on one side of the substrate, and forming a micro-hole array on the optical film layer, wherein an orthographic projection of the micro-hole array on the substrate at least partially overlaps with that of the at least one photosensitive element on the substrate,
wherein when the at least one photosensitive element is provided, the method further comprises:

providing a first backlight source and at least one light emitting element on the substrate;

the step of providing the at least one photosensitive element, the first backlight source, and the at least one light emitting element comprises:

micro-transfer printing at least one of the at least one photosensitive element, the first backlight source, and the at least one light emitting element onto the substrate.

14. The method for manufacturing a backlight module according to claim 13, further comprising:

making an orthographic projection of the micro-hole array on the substrate at least partially overlap with that of the at least one light emitting element on the substrate when the micro-hole array is formed.

* * * * *